June 26, 1951 H. T. HONIG 2,558,685
SHEET GATHERING MACHINE
Filed April 15, 1946 12 Sheets-Sheet 1

INVENTOR
HENRY T. HONIG
BY Liverance and
Van Antwerp
ATTORNEYS

June 26, 1951 H. T. HONIG 2,558,685
SHEET GATHERING MACHINE
Filed April 15, 1946 12 Sheets-Sheet 10

INVENTOR
HENRY T. HONIG
BY Liverance and
Van Antwerp
ATTORNEYS

Fig. 20.

Patented June 26, 1951

2,558,685

UNITED STATES PATENT OFFICE 2,558,685

SHEET GATHERING MACHINE

Henry T. Honig, Dallas, Tex.

Application April 15, 1946, Serial No. 662,247

4 Claims. (Cl. 270—58)

This invention relates to paper handling machines and more particularly to machines in which a plurality of piles of paper are removed and placed in a single pile in proper selected order.

When a plurality of piles of paper sheets are printed or otherwise duplicated, with all the sheets in any one pile identical, it is usually desirous or necessary to remove one sheet from each of the piles in proper order or with one particular sheet on top, another particular sheet second and so on with one sheet from each pile to a group. It is also desirous to place a backing sheet at the bottom of the pile to which the sheets are to be moved and also to place a backing sheet on the top of the pile after a certain number of sheets or books are removed. This sorting and piling of printed or duplicated sheets is usually done by hand which is necessarily slow and costly.

The primary object of the present invention is to provide a machine which will remove the top sheet from each of a plurality of piles of sheets of printed or duplicated sheets and place them in proper order in a single pile. Another object is to provide a machine which will place a backing sheet at the bottom of the pile of sorted and gathered sheets and will place another at the top of the sorted pile. Another object is to provide means for selecting in advance the number of sheets moved to the sorted pile between the backing sheets. Another object is to provide means for accomplishing the foregoing objects quickly and automatically.

Other objects and advantages of the invention will appear from the following description of the embodiment of the invention illustrated in the accompanying drawings, in which.

Referring now to the details of the drawing in which like reference numerals refer to like parts throughout the several views, the machine is provided at its front end with a hollow frame member 25 which is covered at its open inner side with plate 26. A similar hollow frame member 27 closed with plate 28 is provided at the rear end of the machine. Other frame members are secured to and extend longitudinally between the plates 26 and 28 and include a T-section frame member 29, Fig. 5, angle frame member 30, plate 31 and plates 32. These longitudinal frame members are reinforced with vertical frame members 33 and 34 and with the horizontal frame members 35, 36 and 37 secured thereto.

An electric motor 38 is mounted on the lower horizontal frame member 37 which drives shaft 39 continuously at a reduced speed through the speed reducer indicated generally at 40. This shaft 39 provides the means for raising a plurality of sheet supporting tables 41, Figs. 5 and 6, to maintain the top sheet at the proper height. These tables 41 are each secured to a rod 42 which is vertically slidably guided in bearing block 43 secured to the longitudinal frame member 32. Teeth 44 are formed along one side of each rod 42 which mesh with a spur gear 45 keyed to sleeve 46, Fig. 12, freely rotatable in the bearing block 43. A shaft 47 is rotatably mounted longitudinally of the machine in the end frame members 25 and 27 and is freely rotatable in each of the sleeves 46. A toothed ratchet wheel 48 is formed integrally with sleeve 46 and cooperates with ratchet dog 49, Fig. 7, to hold the table from dropping while the clutch is disengaged. This ratchet dog is pivotally mounted with a pin 50 on the bearing block 43.

Means are provided for releasing this holding ratchet dog from the ratchet wheel whereby the table may be lowered and includes a rock shaft 51 rotatably mounted in the end frame members 25, 26 and 28 and has an arm 52 secured thereto, one for each table. A rod 53 is pivotally attached at one of its ends to the lever 52, the other end of which is slidable through an opening in the arm 54 of ratchet dog 49. A collar 55 is secured to the rod 53 and a helical compression spring 56 is located around rod 53 between the collar 55 and arm 54 thereby yieldably holding the ratchet dog 49 in engagement with the ratchet wheel. A nut 57 is screwed onto the threaded end of rod 53 and engages arm 54 of the ratchet dog whereby on a slight clockwise rotation of shaft 51 the ratchet dog 49 is moved away from the ratchet wheel 48 allowing the sheet supporting table to be moved downwardly. A lever 217 is secured to the forward end of shaft 51 adjacent the front face of frame member 25 whereby shaft 51 may be selectively rocked to ratchet engaged or ratchet released position.

Figures 11, 12:
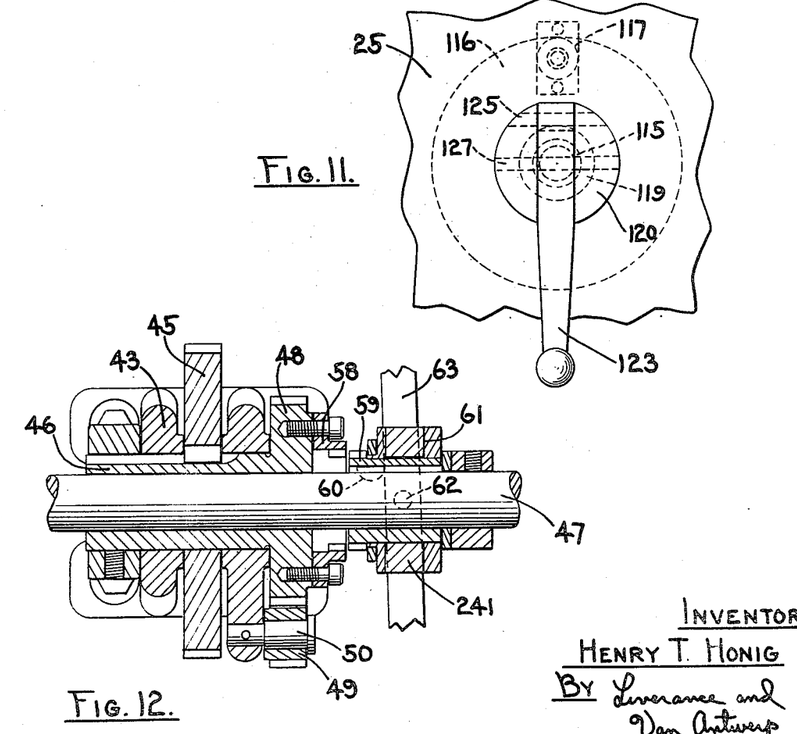
Fig. 11 is an elevational view of the portion shown in Fig. 10.
Fig. 12 is a vertical longitudinal sectional view of the clutch and gear drive for raising the sheet supporting table.

An internally toothed clutch member 58, Fig. 12, is screwed to the side of ratchet wheel 48 and cooperates with an externally toothed clutch member 59 to transmit the rotative motion of shaft 47 to spur gear 45 to raise the sheet supporting table 41. This clutch member 59 is keyed with key 60 to shaft 47 and is provided with an annular grooved portion 61 into which is rotatably located a clutch collar 241 which receives the trunnion pins 62 of clutch lever 63. The clutch lever 63 is pivotally mounted on a bracket 64, Fig. 6, secured to a portion of the machine frame and the outer end thereof is connected through a link 65 to the armature 66 of a solenoid 67 mounted on a fixed portion of the machine frame. A helical tension spring 68 is attached at one end to the clutch lever 63 and at its other end is attached to a bracket 69 secured above the solenoid. When the solenoid 67 is electrically energized the armature moves outwardly moving the clutch lever 63 to engage the clutch members whereby the rotative motion of the shaft 47 is transmitted to the gear 45. When the solenoid is deenergized the spring 68 pulls the clutch lever 63 to clutch disengaging position.

Figure 8:
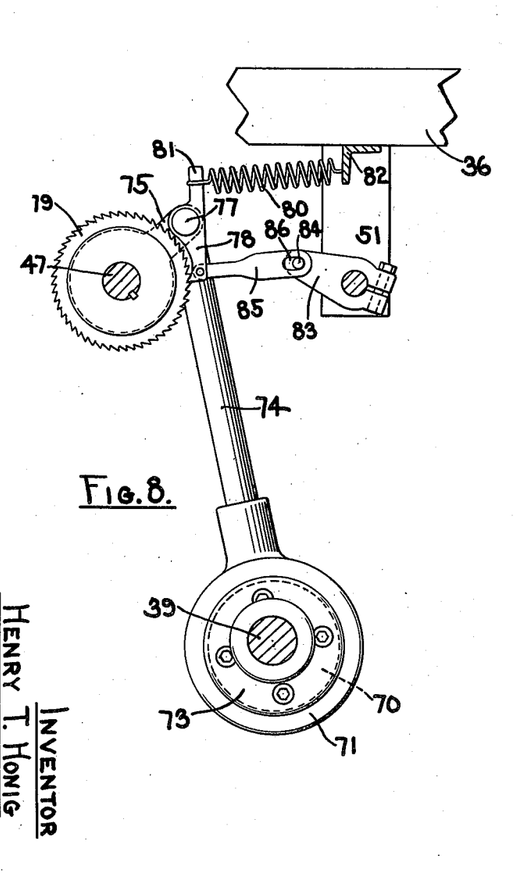
Fig. 8 is a fragmentary vertical sectional view of the eccentric and ratchet for raising the sheet supporting table.
Figure 9:
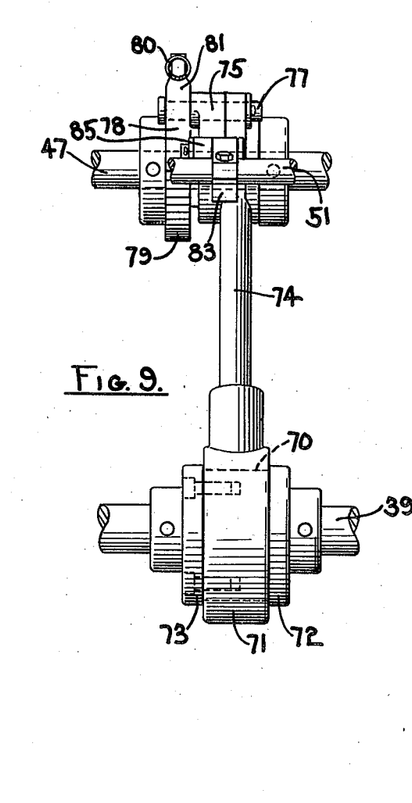
Fig. 9 is a fragmentary elevational view of the portion shown in Fig. 8.

Means are provided for transmitting the rotative motion of shaft 39 to a step by step rotative motion of shaft 47 and is best shown in Figs. 8 and 9. An eccentric collar 70 is secured to the shaft 39 around which is rotatably mounted a ring 71 held from endwise movement relative to the collar 70 by means of a flange 72 at one end of the collar 70 and a circular plate 73 screwed to the collar 70. A pull rod 74 at one end is attached to the ring 71 and at its other end is pivotally attached on a pin 77 to a radially outwardly extending ear 75 of a hub 76 freely rotatably on a shaft 47. A ratchet pawl 78 is also pivotally mounted on a pin 77 and engages a toothed ratchet wheel 79 keyed to the shaft 47. A helical tension spring 80 is attached at one end to an outwardly extending arm 81 of the pawl 78 and at its other end to a bracket 82 secured to the under side of the lateral frame member 36.

Means are also provided for withdrawing the pawl 78 from engagement with the ratchet wheel whereby the sheet supporting tables may be lowered and this is accomplished by an arm 83, secured to the rock shaft 51 pivotally connected by a pin 84 to a link 85 which is pivotally connected to the end of the pawl 78. The pivotal connection between the arm 83 and the link 85 is made with lost motion by having the pin 84 move in the slotted recess 86 in the link 84. When the shaft 39 is rotated the pull rod 74 is given a reciprocating motion which is transferred to rotary motion by the pawl. The pawl in counterclockwise rotary motion slides over the teeth of the ratchet wheel but on clockwise motion the pawl 78 influenced by the spring 80 engages one of the teeth of the ratchet wheel and moves it and shaft 47 clockwise. When the rock shaft 51 is rotated slightly clockwise the arm 83 and link 85 pull the pawl 78 out of engagement with the ratchet wheel 79 whereby the shaft 47 is free to be rotated counterclockwise to lower the sheet supporting table.

Figure 6:
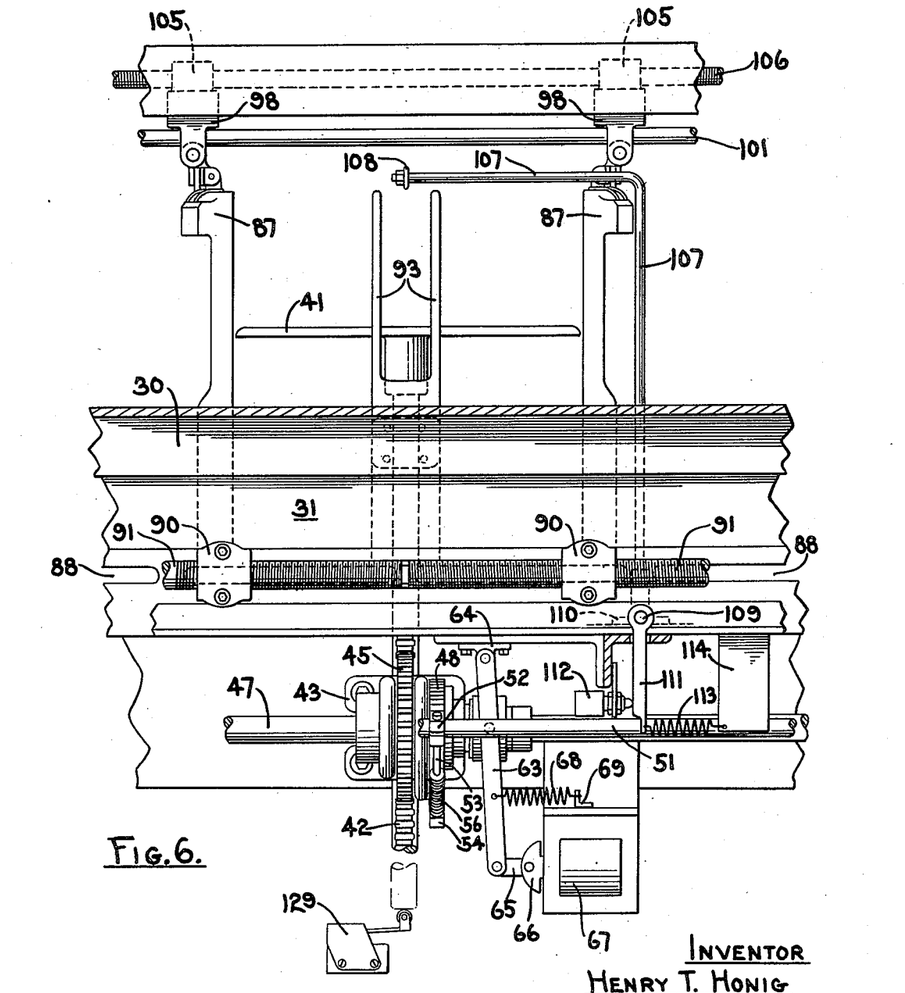
Fig. 6 is a fragmentary vertical longitudinal sectional view of one of the sheet supporting tables taken along line 6—6 in Fig. 5 looking in the direction of the arrows.
Figure 7:
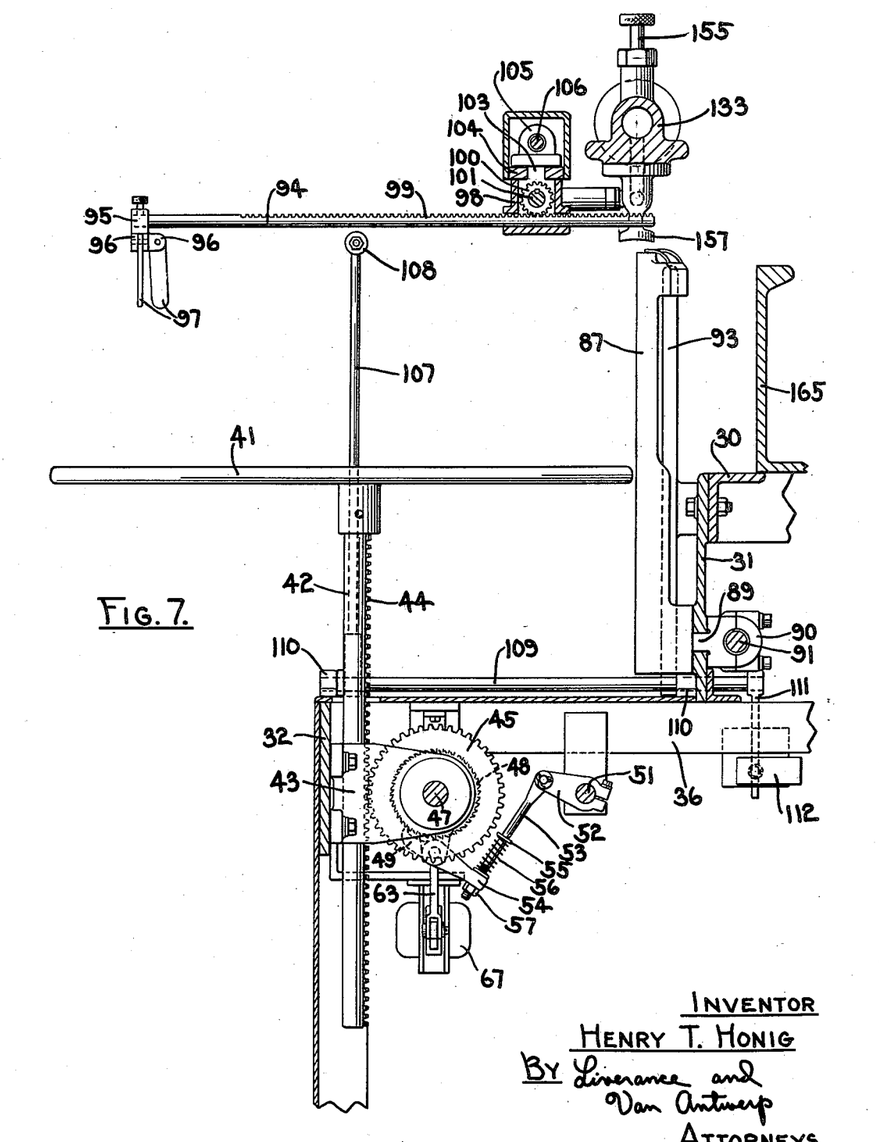
Fig. 7 is a fragmentary vertical transverse sectional view of the portion of the machine shown in Fig. 6.

The inner corners of the sheets supported on the tables are guided vertically by posts 87, as best shown in Figs. 6 and 7, and are shaped to fit the vertical edges of the paper sheets. These guide posts are adjustable longitudinally of the machine to regulate the distance between adjacent guide posts for each table to guide paper sheet of any width within the limits of the adjustment. The guide posts 87 at their bottom ends bear against the frame member 31 and are slidable longitudinally of the machine. They are provided with longitudinal slots 88, one for each guide post, through which the narrowed neck 89 of each of the nuts 90 extend, one secured to each of the guide posts. Each of the nuts 90 bears slidably against the rear face of the frame member 31 and is screw threadedly received on the rod 91 which is rotatably mounted in the frame members 25, 26 and 28 and is provided with right and left hand threads whereby on rotation of the rod 91, by means of a handle 92 secured to its forward end, adjacent guide posts 87 at each table will be moved either toward or away from each other centrally of the table. The inner edges of the sheets of paper are also guided centrally by a vertical central guide post 93 which is screwed intermediate its ends to the frame member 31.

Means are also provided for locating and holding the upper sheets properly at their outer corners, being adjustable to accommodate all sizes within the limit of the adjustment. Rods 94, one for each of the outer corners of the sheets, are located horizontally and laterally of the machine and on their outer ends each has secured thereon a block 95 provided with horizontally extending ears 96 at right angles to each other to which are pivotally mounted and dependent therefrom the guide fingers 97. These guide fingers 97 engage the two outer corners of the upper sheets of each pile of sheets and guide and hold the sheets in their proper location. These guide fingers are adjustably movable to accommodate various widths and lengths of sheets. The rods 94 are each longitudinally slidably mounted in a housing 98 and each rod is provided with rack teeth 99 at its upper side which teeth mesh with a gear 100 keyed to a rod 101 rotatably mounted in each of the housings 98 and in the frame members 25, 26 and 28. A crank 102 is located on the forward end of rod 101 at the front end of the machine whereby on rotation thereof, the guide fingers are moved inwardly or outwardly through shaft 101, gear 100 meshing with rack teeth 99.

Each of the housings 98 are adjustable longitudinally of the machine and have a narrowed portion 103 extending through slots in a bar 104 which bar is secured at its ends to the plate frame members 26 and 28. This narrowed portion 103 is secured to a block 105 with the housing 98 bearing slidably against the underside of the bar 104 and block 105 bearing slidably against the underside of the bar 104. The block 105 is screw threadedly received on a rod 106 rotatably mounted in the frame members 25, 26 and 28 and is provided with right and left hand screw threads. Lever 102 is movably adapted to be located on the end of either shaft 101 or 106 and when located on the end of the shaft 106 and on rotation thereof the guide fingers 97 are moved toward or away from each other at each table and maintained centrally thereof.

The solenoid 67 when energized holds the clutch members 58 and 59 in engagement to raise the tables 41 and the sheets thereon. When the top sheet on each table is at the proper height to be picked up and moved to the conveyor, means are provided to deenergize the solenoid whereby the clutch will become disengaged to stop further vertical movement of each table. Adjacent each table 41 an arm 107, Figs. 6 and 7, has a horizontal portion extending over the sheets of paper with a feeler head 108 at the end thereof and a vertical portion which is secured to one end of a rod 109. The rod 109 is rotatably mounted in bearing blocks 110 secured to the frame member 36 and a downwardly depending lever 111 is secured to its inner end. A switch 112 is mounted on the frame member 36 closely adjacent the lower end of the lever 111 and a helical tension spring 113 is attached to the lower end of lever 111 and at its other end is attached to a plate 114 secured to the frame of the machine yieldably holding lever 111 out of contact with switch 112 and yieldably holding feeler button 108 downwardly against the top sheet of the pile of sheets on each table.

Figure 10:
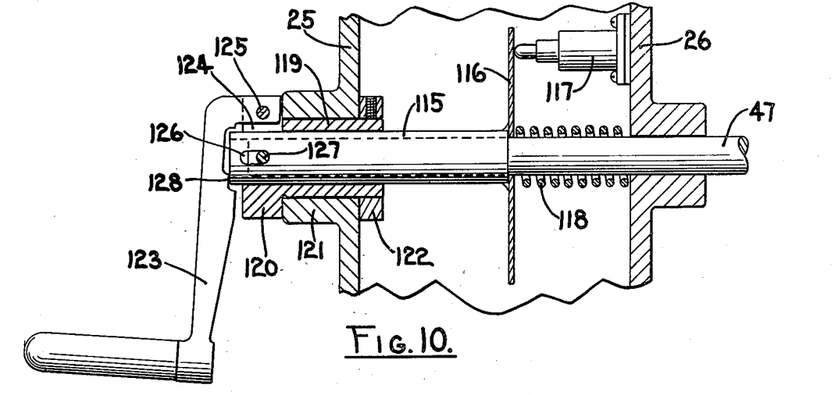
Fig. 10 is a fragmentary vertical sectional view of the handle and handle operated switch means for manually raising and lowering the sheet supporting tables.

When all the sheets of any one of the tables have been removed and that table moves upwardly and the solenoid 67 becomes deenergized through the lever 107 and the switch 112 and clutch members 58 and 59 become disengaged. Means are provided for reengaging the clutch members 58 and 59 and as shown in Figs. 10 and 11, shaft 47, to which clutch members 59 are keyed, extend forward through the frame members 25 and 26. A tube 115 is slidably located over the end of the shaft 47 and has a disk 116 secured to the inner end thereof, the tube and disk being movable to operate switch 117 secured to the front face of plate 26. A compression spring 118 is located around the shaft 47 and is compressed between the plate 26 and disk 116 yieldably holding the disk away from the switch 117. A collar 119 having a flange 120 is rotatably mounted in a bearing 121 formed in the frame member 25, and on the tube 115. A collar 122 is secured over the inner end of the collar 119 to keep it from sliding endwise. A crank 123 is located in a slot 124 formed in the flange 120 and is rotatably mounted on a pin 125 extending therethrough. The tube 115 is provided with diametrically opposite longitudinal slots 126 and a pin 127 extends through the shaft 47, slots 127 in tube 115 and through flange 120 whereby on rotation of crank 123 shaft 47 will be rotated. A shoulder 128 formed on the crank 123 engages the end of the tube 115 and when the lever 123 is pushed inwardly the tube 115 and disk 116 are also moved inwardly thus operating the switch 117. The switch 117 is electrically connected to the solenoid 67 so that when the circuit to any one of the solenoids 67 is broken by reason of the sheets of paper having all been removed from the respective table, the circuit to any of the solenoids 67 may be restored by pushing inwardly on crank 123 whereby the clutch members 58 and 59 become engaged thus allowing the tables to be lowered by a counterclockwise rotation of the crank 123.

Figure 5:
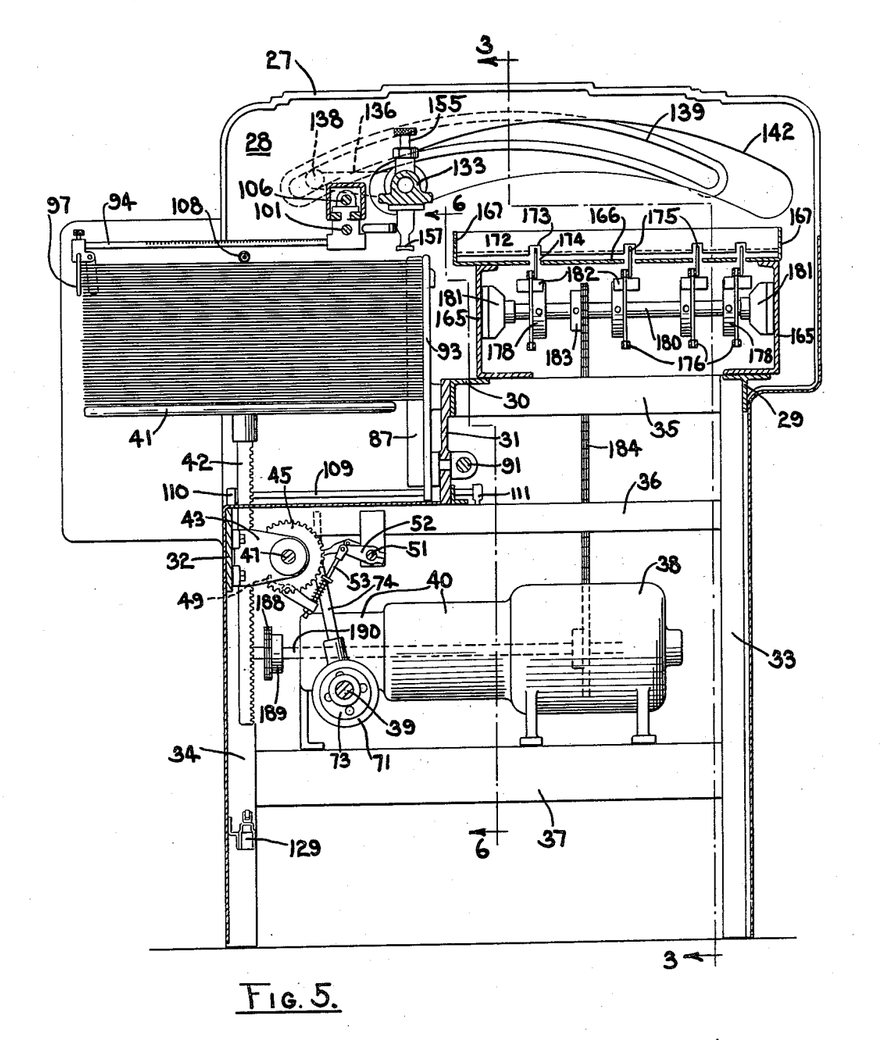
Fig. 5 is a vertical transverse sectional view through the machine showing the vertically movable printed sheet supporting table and the conveyor and the drive therefor taken along line 5—5 in Fig. 3 looking in the direction indicated.

When any one of the tables reaches its lowermost position the clutch for that table must become disengaged and this is accomplished by providing a switch 129, Figs. 5 and 6, one for each table mounted in location to be operated by the end of the rod 44, on which the table is mounted, when the table reaches its lowermost position. The switch 129 is electrically connected with the solenoid 67 and, when normal, the circuit to the solenoid 67 is closed whereby the clutch is engaged and when depressed by the rod 44, as it reached its lowermost position, the circuit to the solenoid is broken, disengaging the clutch for that table and allowing continued rotation of shaft 47 for lowering of the other tables. As each table reaches its lowermost position the clutch for that table is disengaged until all the tables are lowered and all the clutches are disengaged. After the tables are supplied with a new pile of sheets of paper the circuits to the solenoids 67 are restored by pushing inwardly on the crank 123 whereby the clutches are all engaged and on rotation of the crank 123 the tables may be raised.

Figure 3:
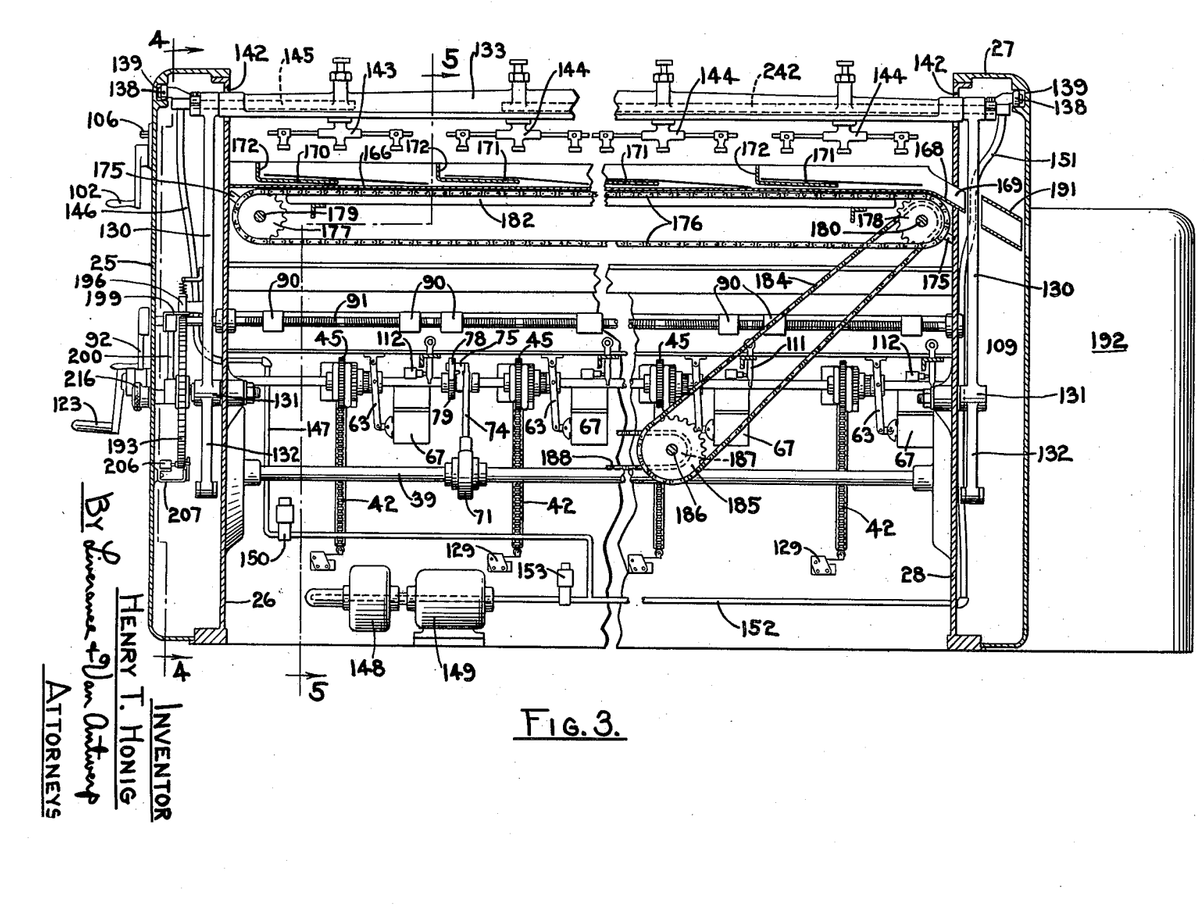
Fig. 3 is a vertical longitudinal sectional view through the machine taken along line 3—3 in Fig. 5 looking in the direction of the arrows.
Figure 4:
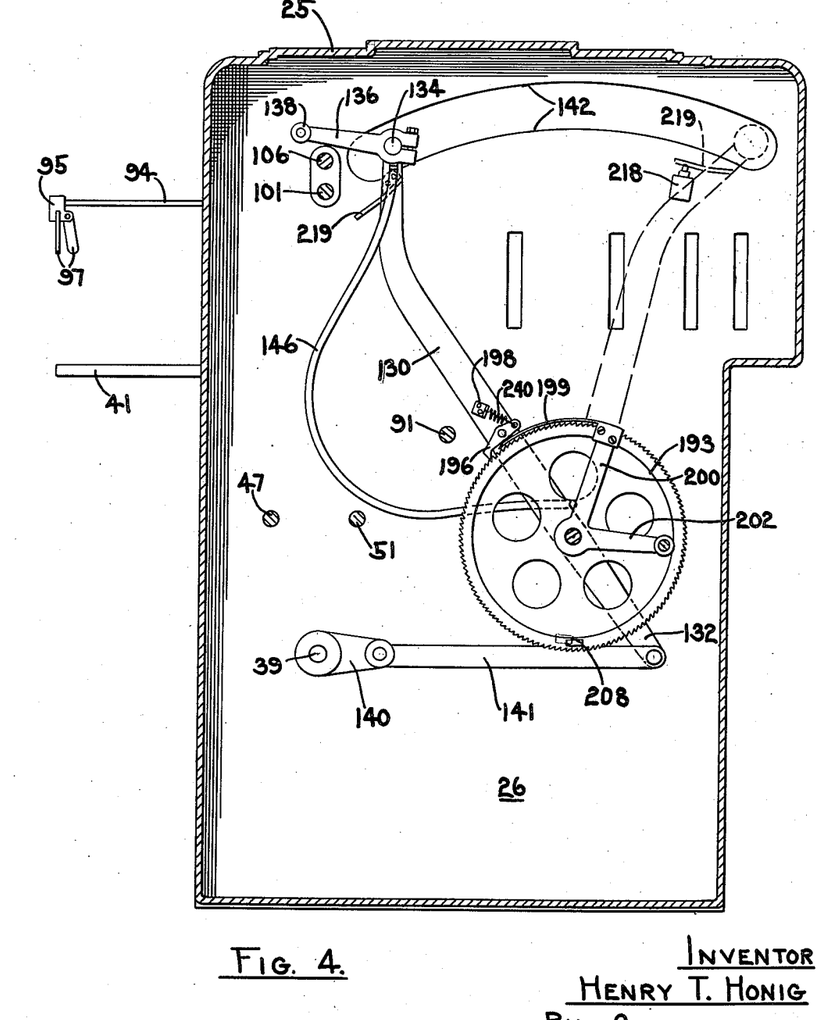
Fig. 4 is a vertical transverse sectional view showing the operation of the swing arm which supports the suction cross head taken along line 4—4 of Fig. 3 looking in the direction indicated.
Figure 13:
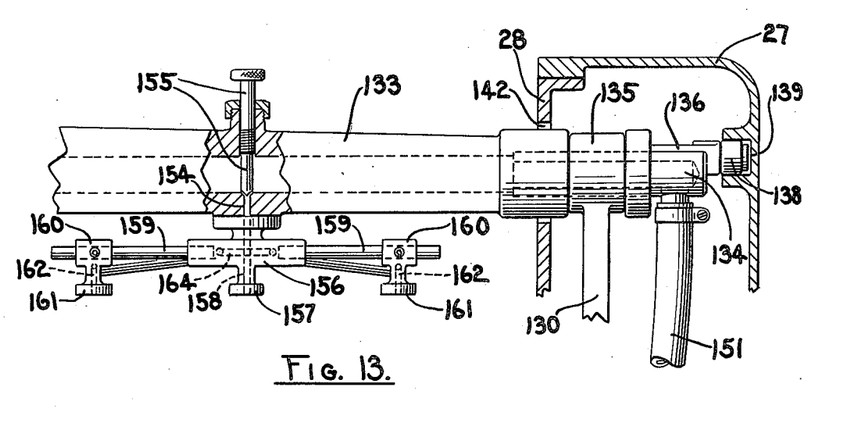
Fig. 13 is a fragmentary vertical longitudinal sectional view through the frame of the machine showing the suction cross head with a portion shown in cross section.
Figure 14:
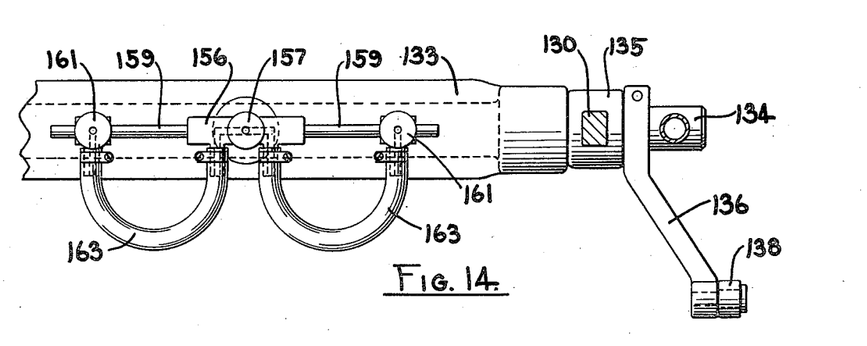
Fig. 14 is an under plan view of the suction cross head as shown in Fig. 13.
Figure 15:
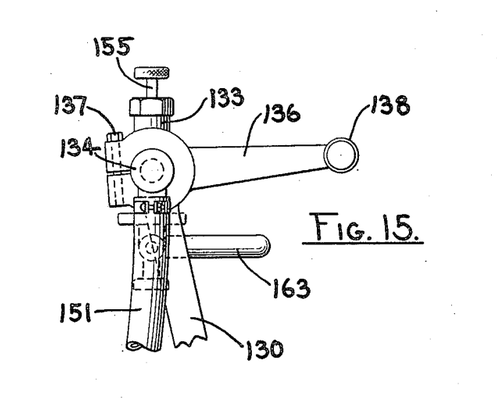
Fig. 15 is an end view of the suction cross head.

Means are provided for removing the printed sheets and the backing sheets from the tables to a conveyor which includes upwardly extending arms 130, Figs. 3 and 4, pivotally mounted at 131 on each of the plate frame members 26 and 28 each having a downwardly extending arm 132 formed integral therewith. A suction cross head 133, as best shown in Figs. 13, 14 and 15 having tubular trunnions 134 secured to and extending outwardly from both ends thereof is pivotally mounted in boss 135 at the upper end of each arm 130. The suction cross head 133 is pivotally mounted in the arms 130 whereby it may be maintained in a horizontal position in moving between the tables and the conveyor and this is accomplished by arms 136 each secured by means of a screw 137 to the tubular trunnions 134 at each end of the cross head. Each arm 136 is provided at its outer end with a roller 138 which is adapted to ride in a cam track 139 formed in the inner face of the hollow end frame members 25 and 27. Thus rollers 138 following in cam tracks 139 maintain the cross head in horizontal position at all times during its movement.

The cross head 133 is movable from the pick-up position over the tables to the delivery position over the conveyor by means of cranks 140 secured to both ends of the shaft 39 and pivotally connected by a link 141 to the lower end of the arms 132. Thus the rotary motion of the shaft 39 is transferred to a rocking motion of the arms 130 whereby the cross head 133 moves arcuately in openings 142 formed in the plate members 26 and 28.

Figure 1:
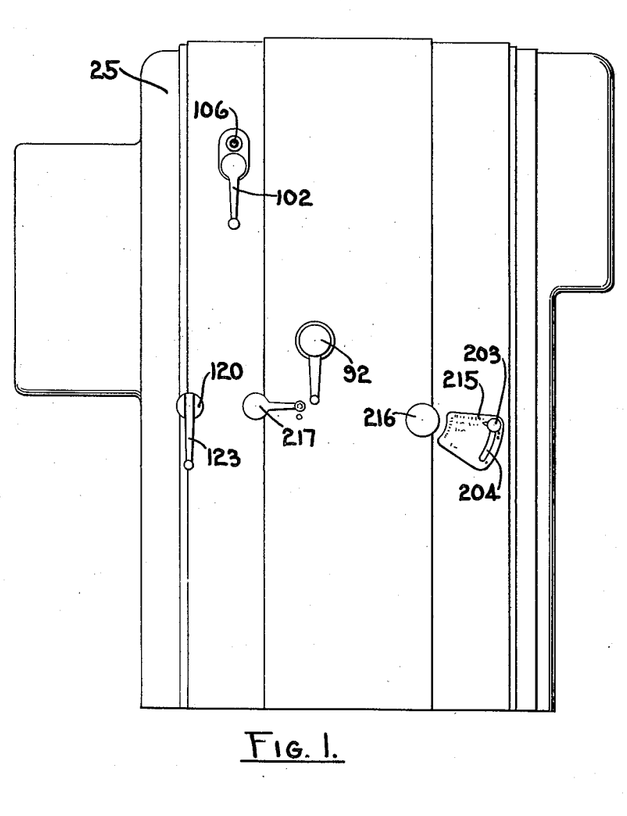
Fig. 1 is a front elevational view of a machine incorporating the principles of my invention.
Figure 2:
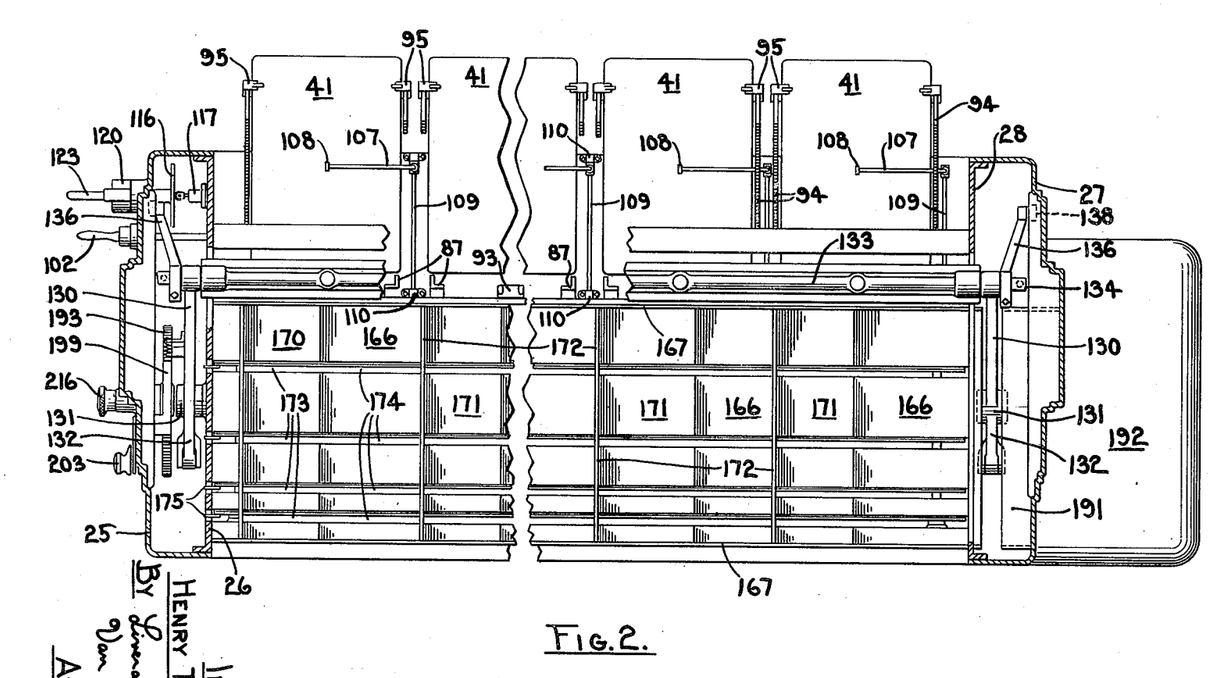
Fig. 2 is a plan view thereof with the middle portion of the machine broken away.

The backing sheets are placed on the table nearest the front of the machine or the one to the left in Fig. 2 and the cross head 133 is provided with a suction head assembly 143 to pick up the backing sheets and deliver them to the conveyor. The printed sheets are placed on the other tables and the cross head 133 is provided with a suction head assembly 144 for each table carrying printed sheets. The suction cross head has a short passage 145 at one end which communicates with the adjacent trunnion tube at one end and at its other end is connected by a flexible hose 146 to an air pipe 147 which is connected to a suction pump 148 driven by an electric motor 149 with a solenoid operated valve 150 interposed in the pipe 147. As the crosshead moves to its various positions the air hose 146 will flex to follow the crosshead. The solenoid operated valve 150 controls the suction to suction head assembly 143. The cross head is also provided with a long central passage 242 which communicates with all the suction head assemblies 144 which pick up the printed sheets and communicates with the tubular trunnion 134 at the rear end of the cross head. A flexible air hose 151 is connected at one end to this trunnion 134 and at the other end is connected an air pipe 152 which is connected to the suction pump 148 with a solenoid operated valve 153 interposed in the pipe 152 to control the vacuum to the suction heads 144.

Each of the suction head assemblies 143 and 144 as best shown in Figs. 13, 14 and 15, is secured to the underside of the cross head 133 and communicates with the passage 154, the flow of air through these passages being controlled by a hand operated valve 155 whereby when any table is not in use the respective valve for that table may be turned off. Each suction head assembly has a central suction head 156 with a suction cup 157 downwardly extending therefrom having a central opening 158 connected to passage 154. Rods 159 are secured to and extend longitudinally from both ends of each suction head 156 and each has adjustably mounted thereon a suction head 160 provided with a downwardly extending suction cup 161 communicating with a vertical passage 162. Each of the suction heads 160 is pneumatically connected to the air passage 154 by means of flexible air hose 163, one of which is connected between each suction head 160 and its respective suction head 156 with the outer ends of the hoses communicating with the passages 162 and at their inner ends with the horizontal passages 164 in the suction heads 156 opening to the passage 158.

Conveyor frame members 165 are mounted in parallel relation longitudinally of the machine on the frame members 29, 30 and 35 as best shown in Fig. 5. A conveyor plate 166 having upturned edges 167 is secured to the top side of the frame members 165 and extends longitudinally of the machine extending between plate members 26 and 28 and terminating at its rear end adjacent the plate member 28 in the downwardly angularly extending chute 168, Fig. 3, projecting through opening 169 in the plate 28.

A tray 170 at the front end of the machine to receive the backing sheets and a plurality of trays 171 to receive the printed sheets are secured between the upturned edges 167 of the conveyor plate with one tray opposite each table 41. Each tray has an upwardly extending forward edge 172 with the bottom of each tray spaced slightly above the conveyor plate 166. The bottom of each tray extends substantially half way between its forward upturned edge and the upturned edge of the next adjacent tray. Each tray is provided with a plurality of longitudinal openings through the bottom thereof and partially up the upturned forward edge 172.

The conveyor plate 166 is provided with a plurality of corresponding longitudinal slots 174. These openings 173 and slots 174 are provided for the passage of fingers 175 of which there are two sets secured at diametrically opposite locations on chains 176 located around sprockets 177 and 178. The sprockets 177 and 178 are attached to the shafts 179 and 180 adjacent the forward plate member 26 and rear plate members 28 respectively and are rotatably mounted in bearing members 181 secured to the inner faces of the conveyor the frame members 165. Bars 182 are supported under the upper run of the chains 182 to support the chain horizontally without sagging whereby the fingers 175 will be effective to move the sheets from each tray to the chute 168. A sprocket 183 is secured to the shaft 180 which is driven by a chain 184 from a sprocket 185 secured to a shaft 186 rotatably mounted in the frame of the machine. Another sprocket 187 is secured to the shaft 186 driven by a chain 188 from a sprocket 189 secured to a shaft 190 extending from and driven by the speed reducer 40. Thus the shaft 180 and the conveyor chain with fingers 175 thereon are driven by the motor 38 through the speed reducer and the chain and sprocket drive.

Thus when a backing sheet and printed sheets are delivered to the trays 170 and 171, the fingers 175 moving through the openings 173 and slots 174, first engage the backing sheet on the tray 170 moving it toward the rear of the conveyor where it will be moved from the tray 170 onto the conveyor plate 166 and under the first printed sheet. Then the fingers 175 engage the forward edge of the first printed sheet on the forward tray 171 moving the back sheet and the first printed sheet toward the rear of the machine until the printed sheet is moved from the tray onto the backing sheet. Thus the fingers move along until all the sheets deposited on the trays are moved along with each subsequently engaged sheet on top of the previously engaged and moved sheet. The gathered sheets are moved to chute 168 from which they move by gravity through an auxiliary chute 191 into a receptacle 192 which is designed to receive and properly locate the sheets in a single pile.

Figure 16:
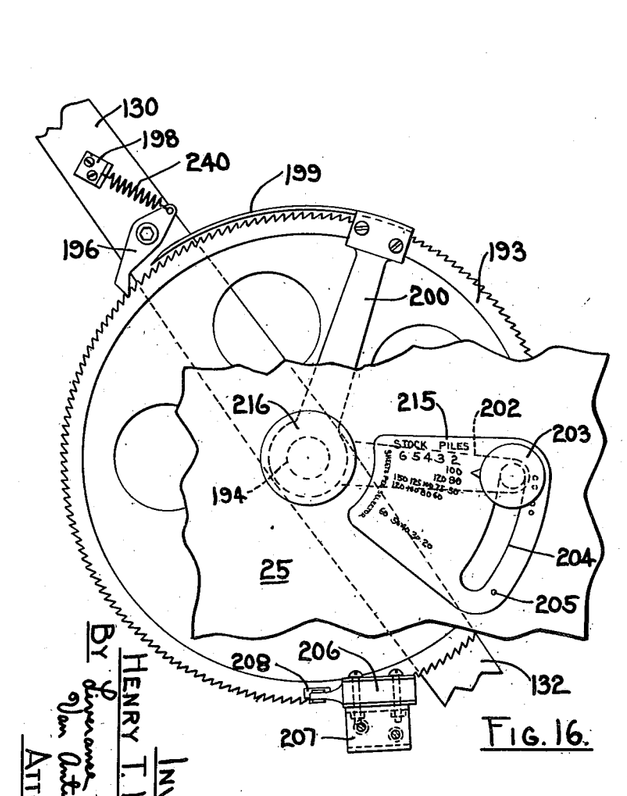
Fig. 16 is a fragmentary elevational view of the means for controlling the feeding of the backing sheets.
Figure 17:
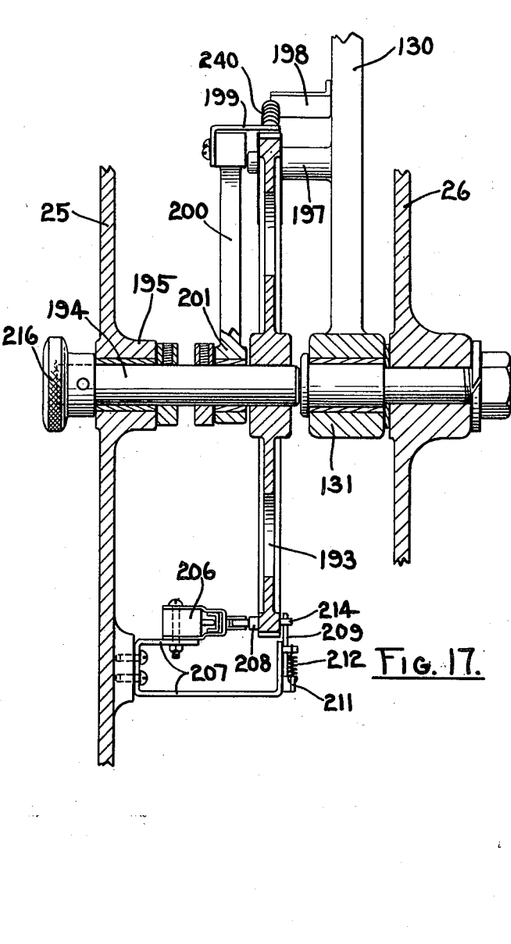
Fig. 17 is a vertical sectional view of the portion shown in Fig. 16.
Figure 18:
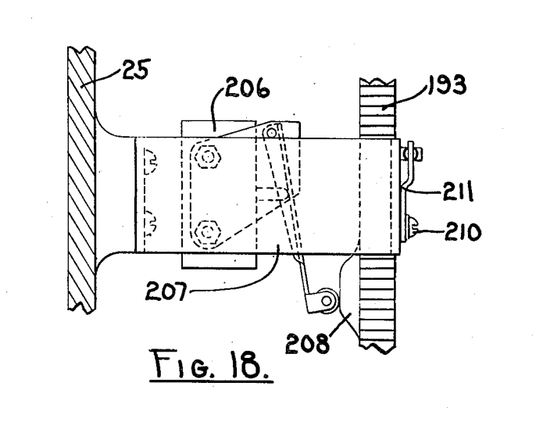
Fig. 18 is a fragmentary under plan view of the switch for controlling the feed of the backing sheets and the cam on the ratchet wheel for operating the switch.

The usual practice is to have a backing sheet at the bottom of the gathered pile of sheets and another backing sheet at the top of the pile of a selected amount of gathered sheets. The mechanism for accomplishing this is best shown in Figs. 4, 16 and 17 and includes a ratchet wheel 193 which is secured to a rock shaft 194 rotatably mounted in a boss 195 formed in the front frame member 25. A knob 216 is secured to the forward end of shaft 194 whereby the shaft and wheel may be manually rotated for resetting. A ratchet pawl 196 is rotatably mounted on a boss 197 formed on the front face of one arm 130 and is yieldably held in operating engagement with the ratchet wheel 193 by means of a tension spring 240 connected at one end to the pawl 196 and at its other end to the bracket 198 secured to the arm 130.

Means are provided for regulating the amount of rotative motion given to the ratchet wheel 193 by the rocking motion of the arm 130 which includes a guard 199 of arcuate shape located closely adjacent the teeth of the ratchet wheel, secured to the outer end of an arm 200 provided with a hub 201 on which it is rotatably mounted on shaft 194. Another arm 202 is formed integral with the hub 201 having a knob 203 at its outer end, the shank of which is movable in the arcuate slot 204 in the frame member 25. Detent means are movable into openings 205 by yieldably holding the knob at selected position.

A switch 206 is mounted adjacent the lower side of the ratchet wheel 193 on a bracket 207 secured to the inner face of the frame member 25. The switch 206 is actuated by means of a single cam 208 formed at one side of the ratchet wheel near its periphery. The switch 206 is electrically connected to the solenoid operated valve 150 whereby when the switch 206 is depressed by the cam 208 the valve 150 will be opened causing the suction head assembly 143 to pick up one backing sheet from the table 41 to be delivered to the tray 170.

Figure 19:
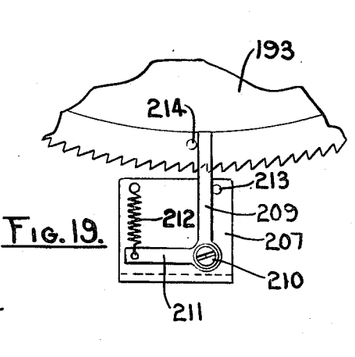
Fig. 19 is a rear view of a portion of the ratchet wheel for controlling the feeding of the backing sheets together with the stop for resetting of the ratchet wheel.

Stop means are provided whereby the ratchet wheel, on being reset by rotating in a clockwise direction, will be stopped at the proper location with the cam 208 depressing the switch 206 whereby a backing sheet will be delivered to the conveyor on the first cycle of operation so that the backing sheet will be at the bottom of the pile of gathered sheets. A stop finger 209 as best shown in Figs. 17 and 19 is pivotally mounted on the bracket 207 on a screw 210. The stop finger has a right angular arm 211 to which is attached a tension spring 212 the other end of which is attached to the bracket 207.

A stop pin 213 extends outwardly from the face of the bracket 207 and is engageable by the stop finger 209 to limit the clockwise rotation thereof as shown in Fig. 19. Another stop pin 214 extends outwardly from the rear face of the ratchet wheel 193 and engages the stop finger 209 to limit the counterclockwise rotation of the ratchet wheel 193 as shown in Fig. 19 or the clockwise rotation as shown in Fig. 16. The rotative motion of the ratchet wheel on each complete rocking motion of the arm 130 and may be regulated by moving the knob 203 and consequently the guard 199 to allow the pawl to engage more or less teeth during its movement. The more teeth exposed beyond the end of the guard the less printed sheets will be delivered to the conveyor and to the receptacle 192 before the cam 208 depresses the switch 206 to cause a backing sheet to be fed to the top of the pile of gathered sheets. The amount of printed sheets to be delivered to the pile of gathered sheets is indicated on plate 215 fastened to the front of frame member 25 adjacent the knob 203.

A switch 218 as shown in Fig. 4, is electrically connected to the solenoid operated valve 153 and is secured to the forward face of the plate 26 and is engageable by a cam plate 219 secured to the rear face of one arm 130. As the arm 130 approaches the limit of its stroke over the trays and conveyor the cam plate 219 depresses the switch 218 closing the valve 153 thereby momentarily cutting off the suction to all the suction heads assemblies 143 and 144. Thus when the cross head 133 picks up a sheet of printed paper or backing sheet from each of the tables 41 and moves them over the trays and the conveyor, the suction to the suction heads is shut off to release the sheets and backing sheet from the suction heads and allow them to drop onto the trays.

Figure 20:
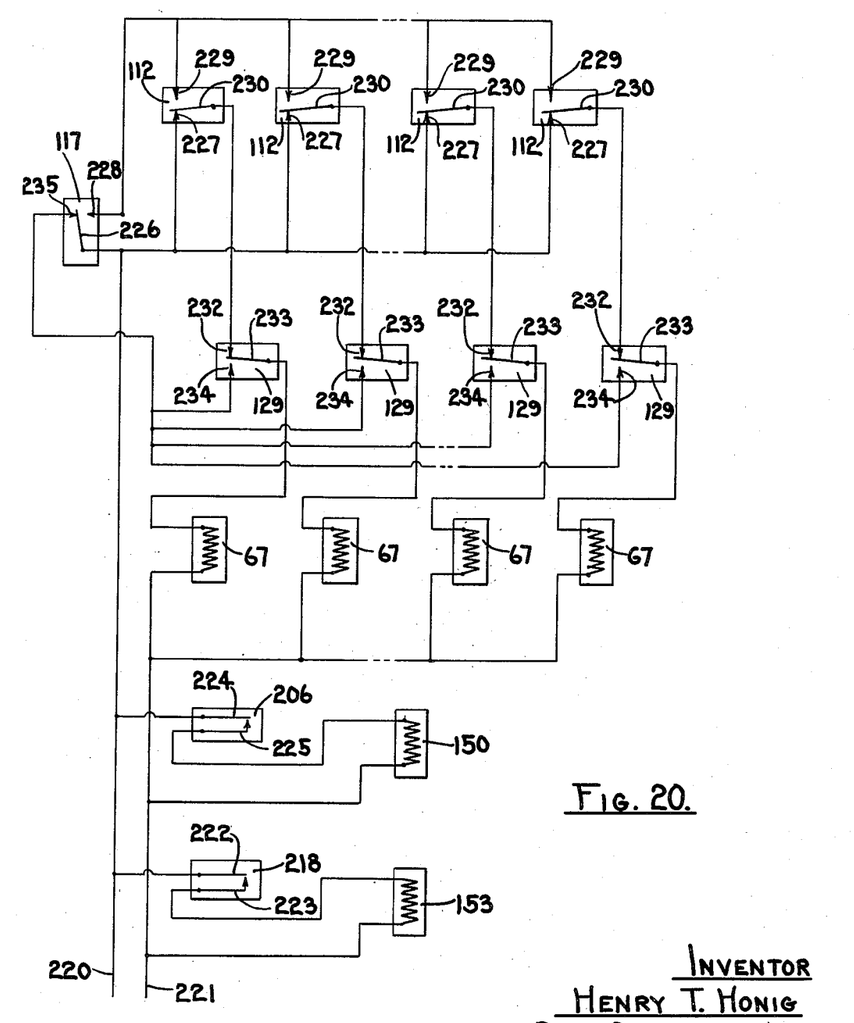
Fig. 20 is an electric wiring diagram of the control of the clutches for raising and lowering the sheet supporting tables and the control of the suction to the suction cross head.

The wiring diagram for the electrical operation of the machine is shown in Fig. 20 which shows the incoming line for electric current indicated as 220 and 221. The line 220 is connected to a stationary contactor 222 of the switch 218. A contactor 223 movable by the cam plate 219 secured to the arm 130 is electrically connected to one end of the coil of the solenoid operated valve 153 the other end of the coil is electrically connected to the other side of the incoming line 221. When the contact is broken between the contactor 223 and the contactor 222 the solenoid operated suction valve 153 is open causing suction at each suction head and when the contactor 223 is moved into contact with the contactor 222 by the cam plate 219 the solenoid valve 153 is closed stopping the suction at the suction heads thus causing the suction heads to drop any sheets held thereby.

One side of the incoming line 220 is also connected to a stationary contactor 224 of the switch 206 and a movable contactor 225 operated by the cam 208 in ratchet wheel 193 is electrically connected to one side of the coil of the solenoid operated valve 150, the other end of the coil being electrically connected to incoming line 221. When contact is broken between the contactor 225 and the contactor 224, the solenoid valve 150 is closed shutting off suction to the suction head assembly 143 whereby no backing sheet will be picked up. When the contactor 225 is in contact with the contactor 224, being moved into contact by the cam 208, the valve 150 is opened allowing the suction head assembly to pick up a backing sheet. The suction head will drop the backing sheet over the conveyor when the switch 218 is depressed closing the valve 153 causing all suction heads to drop the sheets carried thereby.

The incoming line 220 is also connected to a movable contactor 226 of the crank operated switch 117 and to a pole 227 of each of the switches 112 for each table. A pole 228 of the switch 117 is electrically connected to an opposite pole 229 of each of the switches 112. A movable contactor 230 is connected to one pole 232 of each switch 129 and normally makes contact as shown in the drawing with the pole 227 and when moved by the feeler button 108 at each table it makes contact and with the pole 229. Another opposite pole 234, of each of the switches 129, is electrically connected to the pole 235 of the switch 117. The movable contactor 233 is electrically connected to one side of the coil of the solenoid 67 for clutch operation. The other side of the coil for each clutch solenoid 67 is electrically connected to the other side 221 of the incoming line. The movable contactor 233 normally makes contact with the pole 232 as shown and is movable by downward movement of the rod 44, on which each table is located, when the table reaches its lowermost position breaking contact therebetween to disengage the clutch and to make contact between the contactor 233 and the pole 234. The positions shown in Fig. 20 are the normal operation positions.

During the operation when any one of the tables reaches its uppermost position, when all the sheets thereon are removed, the table moves the feeler button 108 upwardly which results in the moving of the contactor 230 of the switch 112 breaking contact with the pole 227 and making contact with pole 229 of switch 112. This breaking of the contact with the pole 227 deenergizes the solenoid 67 causing the clutch for that table to become disengaged whereby that table will not be moved further upwardly.

As each table reaches its uppermost position the clutch for that table will become similarly disengaged stopping further upward motion of the table. The position of the switch 117 shown in Fig. 20 is its normal position and in order to lower any table that has reached its upper limit of movement the lever 123 must be pushed inwardly causing the contactor 226 of the switch 117 to make contact with the pole 228 thus the circuit is again closed to energize each solenoid 67 engaging each clutch between the shaft 47 and the gear 45 wherein on rotation of the crank 123 in a counterclockwise direction the tables may be lowered. It will be noted that after any of the tables has moved slightly downward from its uppermost limit, the feeler button 108 moves downwardly moving the contactor 230 of switch 112 for that table from contact with the pole 229 to contact with the pole 227 whereby the solenoid 67 will remain energized holding the clutch in engagement so that table and other tables likewise may be moved manually downwardly.

While the tables are being lowered the crank 123 is held inwardly maintaining contact between the contactors 226 and pole 228. When any one of the tables reaches its lowermost position on turning the crank 123, the rod 44 of that table makes contact with the switch 129 moving the contactor 233 from the position contacting the pole 232 whereby the solenoid 67 will become deenergized and the clutch for that table will become disengaged stopping further movement of that table and allowing the crank 123 and the shaft 47 to be further rotated to lower the other tables. As each table reaches its lowermost position the clutch for that table similarly becomes disengaged until all the tables are lowered whereafter the shaft 47 rotates freely without affecting any of the tables. After all the tables reach their lowermost positions the lever 123 is allowed to pivot outwardly thus causing the switch 117 to move to normal position with the contactor 226 contacting the pole 235 closing a circuit to each of the solenoids 67 causing each of the clutches to become engaged whereby they may be moved upwardly step by step on rotation of the shaft 47.

In describing the operation of the gathering machine assume that a complete set of printed sheets have been gathered in the machine and removed therefrom and it is desired to reset the machine to gather in proper relation a number of piles of printed sheets. The crank 123 is pushed inwardly reengaging any disengaged clutches and is rotated together with the shaft 47 and gear 45 meshing with the teeth 44 on the rod 42 to lower the tables to their lowermost positions. As each table reaches its lowermost position the clutch for that table is disengaged whereby on further rotation of the pushed-in crank 123, the clutch for each table is disengaged until all the tables are lowered.

On releasing the crank 123 and allowing it to move outwardly the switch 117 is moved to restore all clutches to engaged position. A pile of printed sheets is placed on each table 41 except the one nearest the front on which a pile of backing sheets is placed. With the electric motor 38 in operation the shaft 39 is turned at a relatively slower speed whereby the cranks 140 at each end are rotated, thereby rocking the arms 130. The suction crosshead 133 pivotally mounted between the upper ends of the arms 130 and maintained in horizontal position, moves to a position over the rear edge of the piles of paper sheets to a position over the trays and conveyor.

The suction head assembly 143 is adapted to pick up one backing sheet at a time and deliver it to the tray 170 and the remainder of the suction head assemblies 144 are adapted, at the same time, to each pick up one paper sheet from each pile and deliver them to the trays 171. The suction hose 145 is attached to communicate with the backing sheet suction head assembly 143 and the suction hose 151 is attached to communicate with the suction head assemblies, 144. Suction is applied to all suction head assemblies 143 and 144 at all times except when the sheets are to be dropped onto the trays over the conveyor when the cam plate 219 on the arm 130 moves switch 218 to close valve 153. The suction to the suction head assembly 143 is further controlled to cut off the suction thereto when no backing sheets are to be removed and delivered to the trays 170.

When the machine is started to run the cam 208 is adjacent the switch 206 whereby the valve 150 will be open to cause a backing sheet to be picked up and delivered to the tray 170 whereby it will be at the bottom of the gathered pile of sheets in receptacle 192. The guard 199 is set by the knob 203 to regulate the number of sheets to be moved from the tables and gathered in the receptacle 192 before the cam 208 again moves the switch 206 to cause the valve 150 to open to move another backing sheet on the pile of gathered sheets.

The crosshead moves back and forth between the piles of sheets on the tables and over the trays and conveyor, first moving a backing sheet and a plurality of printed sheets, then another like amount of printed sheets, and so forth until the ratchet wheel 193 is moved a complete revolution with the cam 208 again opposite the switch 206 whereupon another backing sheet is moved from the table to the tray 170 to be moved by conveyor fingers to the top of the gathered pile.

While the crosshead picks up and delivers sheets to the trays 170 and 171 the conveyor chain 176 moves continuously being timed to cause the fingers 175 to move the sheets along the conveyor shortly after they are delivered to the trays. The sheets are moved along the conveyor with the first sheet moved being on the bottom and the next one moved located above that and so on.

The ratchet wheel 193 may be reset against the stop finger 209 by moving the arm 130 to a position to the left of the machine whereby the pawl 196 will be held from engagement with ratchet wheel 193 allowing the ratchet wheel to be rotated by means of the knob 216 in a clockwise direction as shown in Fig. 16 until the pin 214 engages the stop finger 209.

Having thus described my invention I desire it to be understood that the invention is in no way limited to the particular illustrative embodiment disclosed, the scope being set forth in the appended claims.

I claim:

1. A gathering machine comprising, a plurality of sheet pile stations, at each of which a pile of superimposed horizontal sheets are adapted to be placed, a corresponding plurality of sheet receiving trays, two pivoted arms having swinging ends, a crosshead pivotally mounted on and extending between the swinging ends of said arms, means for swinging said arms to move said crosshead to positions over said sheet piles and said receiving trays respectively, suction means on said crosshead, one for each sheet pile for picking a sheet from each pile and depositing it in a respective tray, means for maintaining said crosshead in position throughout its swinging movement whereby said suction means are maintained at their sheet engaging portions substantially parallel to a horizontal plane, and means for removing sheets from said trays.

2. A gathering machine comprising, a plurality of sheet pile stations, at each of which a pile of superimposed horizontal sheets are adapted to be placed, and further including a back sheet pile station, a corresponding plurality of sheet receiving trays, a movably mounted horizontal crosshead, means for bodily moving said crosshead from positions over said sheet pile and backing the sheet pile stations and said receiving trays respectively, a plurality of suction cups mounted on and movable with said crosshead, said suction cups being equal in number and located to register with said sheet pile and said backing sheet pile stations and their respective receiving trays, said cross head having one passage communicating only with the suction cup for said backing sheet pile, and having a second passage communicating with the suction cups for said other sheet piles, a suction pump, a conduit connecting said backing sheet suction cup passage with said suction pump, a second conduit connecting said second passage for the other sheet pile suction cups with said suction pump, a shut-off valve in each of said conduits, means for opening and closing the valve in the second conduit at each cycle of movements of said crosshead, and means for opening and closing said valve in said first conduit during intermittent cycles of movements of said crosshead, greater in number than single cycles thereof.

3. The structure as defined in claim 2, said means for opening and closing the shut-off valve in the conduit for the backing sheet suction cup comprising, an electric circuit, a switch in said circuit, a ratchet wheel, a pawl engaging the teeth of the ratchet wheel, means for oscillating the pawl synchronized with the movement of said crosshead, means for skipping the pawl from some of the ratchet wheel teeth, means for controlling the number of teeth skipped by said pawl at each oscillation, means actuated by rotation of said ratchet wheel for opening and closing said electric switch, and operative connections of the switch with said shut-off valve for opening and closing said valve.

4. The elements of claim 3, in which the means for controlling the number of teeth skipped by the pawl comprises, an arcuate plate located closely adjacent the periphery of said ratchet wheel in a position to lift the pawl from the ratchet teeth, during a part of the oscillation of said pawl, means for rotating said ratchet wheel counter to its driven rotation, and means for limiting such counter rotation of the ratchet wheel, thereby accurately setting the position of said switch actuating means.

HENRY T. HONIG.

REFERENCES CITED

The following references are of record in the file of this patent:

UNITED STATES PATENTS

| Number | Name | Date |
| --- | --- | --- |
| 460,165 | Stebbins et al. | Sept. 29, 1891 |
| 1,833,292 | Krick | Nov. 24, 1931 |
| 1,865,750 | Elwell | July 5, 1932 |
| 2,160,491 | Cernak | May 30, 1939 |
| 2,167,470 | West | July 25, 1939 |
| 2,230,633 | Williams | Feb. 4, 1941 |
| 2,239,995 | Daneke et al. | Apr. 29, 1941 |
| 2,295,055 | Rupp et al. | Sept. 8, 1942 |
| 2,295,073 | Blythe et al. | Sept. 8, 1942 |
| 2,362,134 | Honig | Nov. 7, 1944 |